(12) United States Patent
Song

(10) Patent No.: US 9,926,014 B1
(45) Date of Patent: Mar. 27, 2018

(54) COWL UNIT FOR VEHICLE

(71) Applicant: Hyundai Motor Company, Seoul (KR)

(72) Inventor: Won Ki Song, Guri-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 15/373,333

(22) Filed: Dec. 8, 2016

(30) Foreign Application Priority Data

Nov. 1, 2016 (KR) .................. 10-2016-0144493

(51) Int. Cl.
  *B62D 25/08* (2006.01)
  *B62D 25/14* (2006.01)
  *B60J 1/02* (2006.01)
  *B62D 27/02* (2006.01)

(52) U.S. Cl.
  CPC .............. *B62D 25/081* (2013.01); *B60J 1/02* (2013.01); *B62D 25/14* (2013.01); *B62D 27/02* (2013.01); *B60Y 2306/09* (2013.01)

(58) Field of Classification Search
  CPC .. B62D 25/081; B62D 25/082; B62D 25/145; B62D 25/088; B62D 25/14; B62D 25/04; B62D 27/02; B60J 10/70; B60J 1/02; B60J 10/02; B60J 10/20; B60J 10/30; B60J 1/006; B60J 10/0031; B60J 10/24
  USPC ......... 296/192, 96.21, 187.09, 208, 93, 201; 264/251, 255, 259, 274, 328.1; 29/897.2, 29/428; 180/219, 229
  See application file for complete search history.

(56) References Cited

U.S. PATENT DOCUMENTS

| 4,826,234 A * | 5/1989 | Komatsu ................. B62D 1/16 280/779 |
| 4,909,566 A * | 3/1990 | Hashimoto ............. B60H 1/24 296/192 |
| 6,193,304 B1 * | 2/2001 | Takahashi ................. B60J 1/02 296/187.04 |
| 6,633,089 B2 * | 10/2003 | Kimura ............... B60R 16/0215 174/72 A |
| 7,357,446 B2 * | 4/2008 | Sakai ..................... B60R 21/34 296/192 |
| 9,033,400 B2 * | 5/2015 | Sasaki ................... B62D 25/08 296/187.09 |
| 9,446,797 B2 * | 9/2016 | Nakauchi ............. B62D 25/081 |

(Continued)

FOREIGN PATENT DOCUMENTS

JP 2012040908 A 3/2012
KR 1999-0024985 U 7/1999

*Primary Examiner* — D Glenn Dayoan
*Assistant Examiner* — Sunsurraye Westbrook
(74) *Attorney, Agent, or Firm* — Slater Matsil, LLP

(57) ABSTRACT

A cowl unit includes a cowl top panel connected with a dash panel by forming a bending line in a vehicle width direction, a cowl top upper panel bonded in the vehicle width direction along a top end of the cowl top panel, a first reinforcement plate, and a second reinforcement plate. The cowl top upper panel is assembled to a front glass. The first reinforcement plate includes a first end bonded to a front surface of the cowl top panel. The cowl top panel is bent downward at the first end of the first reinforcement plate. A second end of the first reinforcement plate is bonded to one side of the bending line. A first closed space portion is formed between the first reinforcement plate and the cowl top panel. The second reinforcement plate includes a first end bonded to a front end of the cowl top upper panel.

20 Claims, 2 Drawing Sheets

(56) References Cited

U.S. PATENT DOCUMENTS

2008/0116721 A1* 5/2008 Shimura .............. B62D 25/081
                                                    296/192
2015/0028629 A1* 1/2015 Sasaki ................. B62D 25/082
                                                    296/192

* cited by examiner

<A>

<B>

COWL UNIT FOR VEHICLE

CROSS-REFERENCE TO RELATED APPLICATIONS

This application claims priority to and the benefit of Korean Patent Application No. 10-2016-0144493 filed in the Korean Intellectual Property Office on Nov. 1, 2016, the entire contents of which are incorporated herein by reference.

TECHNICAL FIELD

The present invention relates to a cowl unit for a vehicle.

BACKGROUND

In general, a cowl top panel of a vehicle is a panel which is disposed in a vehicle width direction corresponding to a lower portion of a front glass.

The cowl top panel is connected with a top end of a dash panel for separating an engine room from a vehicle room. When the vehicle collides, the cowl top panel is manufactured to represent stiffness together with the dash panel in order to prevent components mounted in the engine room from being pushed to the vehicle room.

The stiffness of the cowl top panel is sensitive various noises which are introduced into the vehicle room.

In this case, the noises introduced into the vehicle room include a load noise corresponding to a low frequency generated from a tire, and an acceleration permeation noise corresponding to a high frequency generated from an engine.

In this case, as the cowl top panel vibrates, the low frequency is transferred due to change in negative pressure of internal air in the vehicle room, and the high frequency passed through the cowl top panel and is transferred through the medium of air.

In order to prevent the noises from being introduced, a cowl top panel according to the related art blocks the load noise corresponding to the low frequency by suppressing vibration using a reinforcement plate for connecting a front surface of the cowl top panel with a rear surface thereof.

However, the acceleration permeation noise corresponding to the high frequency transferred with the air passes through the cowl top panel along the reinforcement plate to be introduced into the vehicle room.

Accordingly, there is a need for researches into a structure of a cowl top plate capable of simultaneously blocking a noise corresponding to the low frequency and a noise corresponding to the high frequency.

The above information disclosed in this Background section is only for enhancement of understanding of the background of the invention and therefore it may contain information that does not form the prior art that is already known in this country to a person of ordinary skill in the art.

SUMMARY

Embodiments of the present invention describe a cowl unit for a vehicle having advantages of simultaneously blocking a load noise generated from a tire and an acceleration permeation noise generated from an engine by applying a first reinforcement plate for connecting a front surface of a cowl top panel with one side of a bending line and a second reinforcement plate for connecting one side of the first reinforcement plate with a front end of a cowl top upper panel.

An example embodiment of the present invention provides a cowl unit for a vehicle including a cowl top panel connected with a dash panel by forming a bending line in a vehicle width direction, and a cowl top upper panel bonded in a vehicle width direction along a top end of the cowl top panel to be assembled to a front glass, the cowl unit for a vehicle including: a first reinforcement plate including one end bonded to a front surface of the cowl top panel, bent downward at one side of the first reinforcement plate, an opposite end of the first reinforcement plate bonded to one side of the bending line so that a first closed space portion is formed between the first reinforcement plate and the cowl top panel; and a second reinforcement plate including one end bonded to a front end of the cowl top upper panel, an opposite end of the second reinforcement plate is bonded to a downward bent side of the first reinforcement plate so that the a first closed space portion is formed between the cowl top and the cowl top upper panel.

Further, the first reinforcement plate may be bonded to a front inner side of the cowl top panel forming an upper bonding end bent upward at a front end of the first reinforcement plate.

Further, the first reinforcement plate may be bonded to a plane of one side of the cowl top panel by forming a lower bonding end horizontally bent at a rear end of the first reinforcement plate.

Moreover, the first closed space portion and the second closed space portion may be formed while interposing the downward bent region of the first reinforcement plate as a boundary.

In addition, the cowl top panel may include a third closed space portion between a third reinforcement plate bonded to a front lower portion of the cowl top panel and a front surface of the cowl top panel.

Another embodiment of the present invention describes simultaneously blocking a load noise generated from a tire and an acceleration permeation noise generated from an engine by forming a first closed space portion by a first reinforcement plate for connecting a bottom surface of the cowl panel with one side of a bending line, and forming a second closed space portion by a second reinforcement plate for connecting one side of the first reinforcement plate with a front end of a cowl top upper panel.

Meanwhile, other various effects may be directly or indirectly disclosed in the following description of the embodiments of the present invention. That is, various effects expected according to embodiments of the present invention may be disclosed in the following detailed description.

DETAILED DESCRIPTION OF ILLUSTRATIVE EMBODIMENTS

Hereinafter, an exemplary embodiment of the present invention will be described with reference to the accompanying drawings. Following drawings and a detailed description to be described later relate to one of various exemplary embodiments to efficiently describe characteristics of the present invention. Accordingly, the present invention is not limited to following drawings and description.

Figure 1:
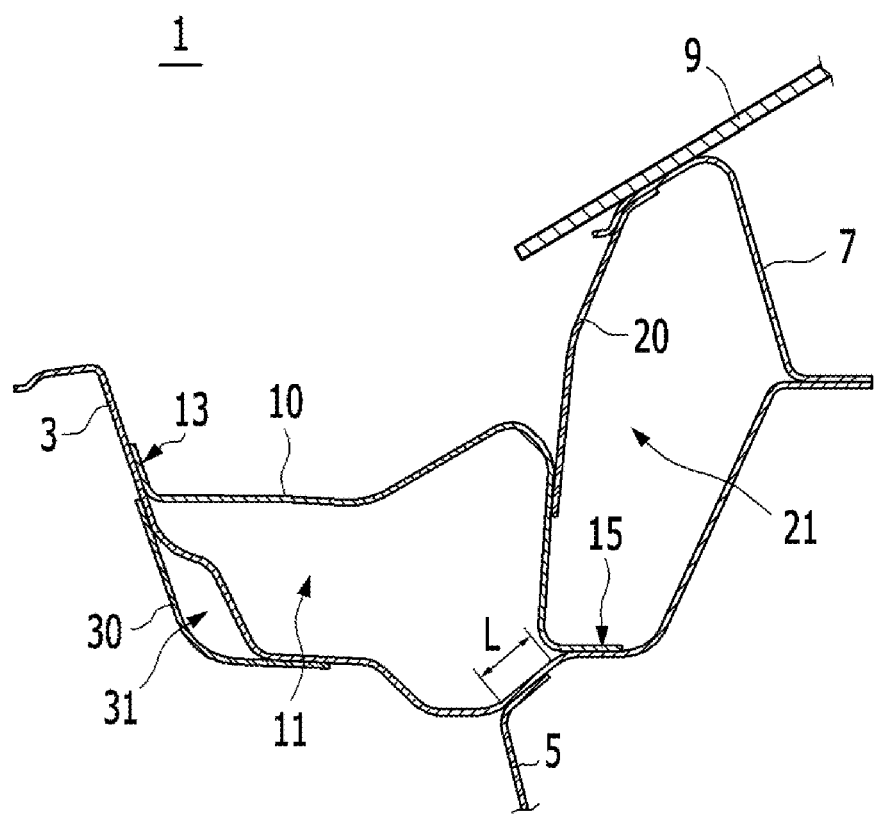
FIG. 1 is a cross-sectional view illustrating a cowl unit for a vehicle according to an exemplary embodiment of the present invention.

FIG. 1 is a cross-sectional view illustrating a cowl unit for a vehicle according to an exemplary embodiment of the present invention.

Referring to FIG. 1, the cowl unit 3 for a vehicle according to an exemplary embodiment of the present invention includes a cowl top panel 3, a cowl top upper panel 7, a first reinforcement plate 10, a second reinforcement plate 20, and a third reinforcement plate 30.

First, the cowl top panel 3 is connected with a dash panel 5 by forming a bending line L in a vehicle width direction.

In this case, the bending line L on the cowl top panel 3 means a region where there is no movement in an elastic range.

The above bending line L refers to a modal line, and is determined through a vibration test.

That is, the bending line L may represent a region without movement in a natural frequency by attaching a vibration sensor to a panel to be tested and applying impact or vibration to the panel.

Further, the cowl top upper panel 7 is bonded in a vehicle width direction along a top end of the cowl top panel 3 to be assembled into a front glass 9.

Meanwhile, one end of the first reinforcement plate 10 is bonded to a front side of the cowl top panel 3.

In this case, the first reinforcement plate 10 is welded to a front inner surface of the cowl top panel 3 by forming an upper bonding end 13 bent upward at a front end thereof.

Further, the first reinforcement plate 10 is bent downward at one side thereof so that an opposite end thereof is bonded to one side of the bending line L.

In this case, the first reinforcement plate 10 is welded at a plane of one side of the bending line L of the cowl top panel 3 by forming a lower bonding end 15 horizontally bent at a rear end thereof.

A first closed space portion 11 is formed between the first reinforcement plate 10 and the cowl top panel 3.

Further, one end of the second reinforcement plate 20 is bonded to a front end of the cowl top upper panel 7.

In this case, the cowl top upper panel 7 is assembled to a bottom end of the front glass 9.

Moreover, an opposite end of the second reinforcement plate 20 is welded to one side of a downward bent region of the first reinforcement plate 10.

A second closed space portion 21 is formed between the second reinforcement plate 20 and the cowl top upper panel 7.

The first closed space portion 11 and the second closed space portion 21 may be formed close to each other while interposing the downward bent region of the first reinforcement plate 10 as a boundary.

In addition, the third reinforcement plate 30 is welded to a front lower portion of the cowl top panel 3.

A third closed space portion 31 is formed between the third reinforcement plate 30 and a front surface of the cowl top upper panel 7.

Figure 2:
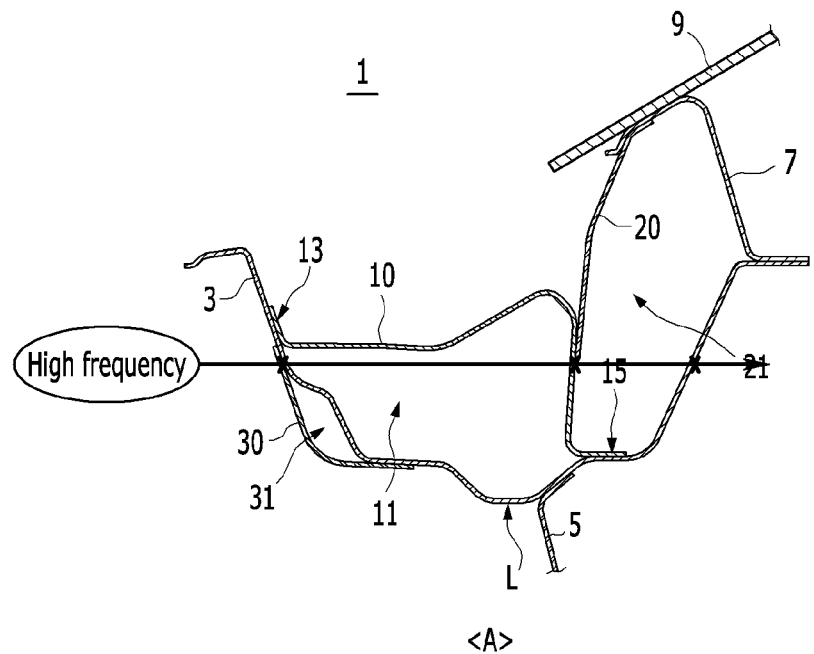
FIG. 2 is a view illustrating a blocked effect of a noise according to a type of noise of the cowl unit for a vehicle according to an exemplary embodiment of the present invention.
Figure 2:
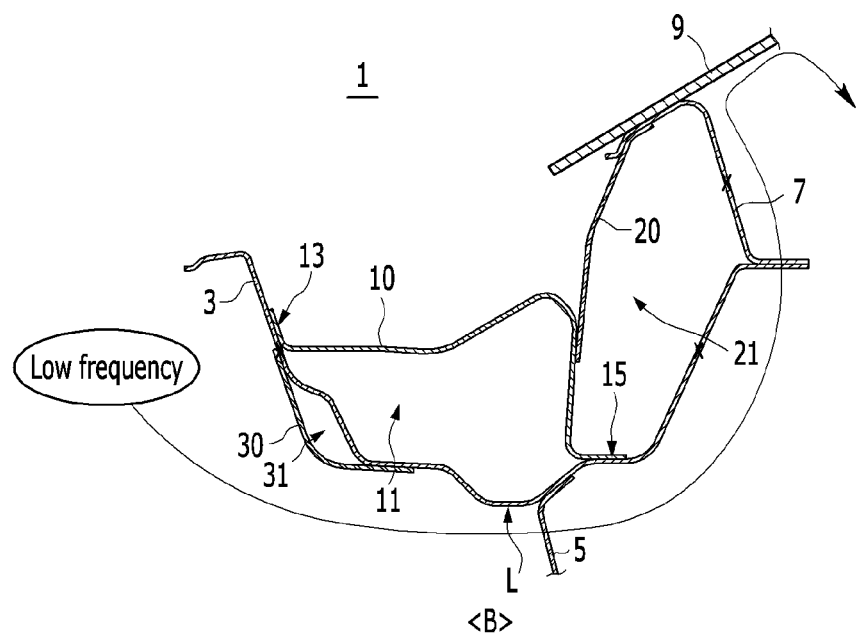

FIG. 2 is a view illustrating a blocked effect of a noise according to a type of noise of the cowl unit for a vehicle according to an exemplary embodiment of the present invention.

Referring to FIG. 2(A), the cowl unit 1 for a vehicle may gradually block a path of an acceleration permeation noise corresponding to a high frequency generated from an engine by the front surface of the cowl top panel 3, the downward bent region of the first reinforcement plate 10, and a rear surface of the cowl top panel 3 to reduce an amount of a high frequency noise which is introduced into the vehicle room.

Referring to FIG. 2(B), the cowl unit 1 for a vehicle may block a load noise corresponding to a low frequency generated from a tire by using the first closed space portion 11, the second closed space portion 21, and the third closed space portion 31 formed by the first reinforcement plate 10, the second reinforcement plate 20 and the third reinforcement plate 30 to prevent the cowl top panel 3 and the cowl top upper panel 7 from vibrating.

That is, if vibration of the cowl top panel 3 and cowl top upper panel 7 is reduced, the cowl unit 1 for the vehicle reduces vibration of the front glass 9 connected with the cowl top upper panel 7, so that air vibration inside the vehicle room may be reduced to reduce an amount of a low frequency noise which is introduced into the vehicle room.

Accordingly, the cowl unit 1 for a vehicle according to an exemplary embodiment of the present invention may block a path of a noise corresponding to a high frequency by the first closed space portion 11 and the second closed space portion 21 formed between the cowl top panel 3 and the cowl top upper panel 7 by the first reinforcement plate 10 and the second reinforcement plate 20, and may block a path of a noise corresponding to a low frequency by reducing the vibration of the cowl top panel 3 and the cowl top upper panel 7 by the first reinforcement plate to the third reinforcement plate 10, 20, and 30.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cowl unit for a vehicle comprising:
   a cowl top panel connected with a dash panel along a vehicle width direction;
   a cowl top upper panel bonded in the vehicle width direction along a top end of the cowl top panel, wherein the cowl top upper panel is configured to be assembled to a front glass at a first region;
   a first vibration reducer to reduce high frequency noise generated from an engine of the vehicle by blocking a path of an acceleration permeation noise so as to reduce an amount of a high frequency noise which is introduced into a vehicle room of the vehicle; and
   a second vibration reducer to reduce low frequency noise generated from a tire by preventing the cowl top panel and the cowl top upper panel from vibrating.

2. The cowl unit of claim 1, wherein the cowl top panel comprises a closed space portion between a reinforcement plate bonded to a front lower portion of the cowl top panel and a front surface of the cowl top panel.

3. The cowl unit of claim 1,
   wherein the cowl top panel is connected with the dash panel by forming a bending line in the vehicle width direction;
   wherein the cowl unit comprises a first reinforcement plate and a second reinforcement plate,
   wherein the first reinforcement plate includes
      a first end bonded to a front surface of the cowl top panel, wherein the cowl top panel is bent downward at the first end of the first reinforcement plate,
      an opposite second end of the first reinforcement plate bonded to one side of the bending line, wherein a first closed space portion is formed between the first reinforcement plate and the cowl top panel; and wherein the second reinforcement plate includes a first end bonded to a front end of the cowl top upper panel, an opposite second end of the second reinforcement plate is bonded to a downward bent side of the first reinforcement plate, wherein a second closed space portion is formed between the cowl top panel, the cowl top upper panel, the second reinforcement plate, and the first reinforcement plate.

4. The cowl unit of claim 1, wherein the first end of the first reinforcement plate is bonded to a front inner side of the cowl top panel forming an upper bonding end bent upward at the first end of the first reinforcement plate.

5. The cowl unit of claim 3, wherein the second end of the first reinforcement plate is bonded to a plane of one side of the cowl top panel by forming a lower bonding end horizontally bent at the second end of the first reinforcement plate.

6. The cowl unit of claim 3, wherein the first closed space portion and the second closed space portion are formed while interposing a downward bent region of the first reinforcement plate as a boundary.

7. The cowl unit of claim 3, wherein the cowl top panel comprises a third closed space portion between a third reinforcement plate bonded to a front lower portion of the cowl top panel and a front surface of the cowl top panel.

8. The cowl unit of claim 3, wherein the first vibration reducer comprises the front surface of the cowl top panel, the downward bent side of the first reinforcement plate, and a rear surface of the cowl top panel.

9. The cowl unit of claim 8, wherein the second vibration reducer comprises the first closed space portion, the second closed space portion, and a third closed space portion formed by the first reinforcement plate, the second reinforcement plate, and a third reinforcement plate.

10. A cowl unit for a vehicle comprising:
a cowl top panel connected with a dash panel along a vehicle width direction;
a cowl top upper panel bonded in the vehicle width direction along a top end of the cowl top panel, wherein the cowl top upper panel is configured to be assembled to a front glass at a first region;
a first vibration reducer to reduce high frequency noise generated from an engine of the vehicle by blocking a path of an acceleration permeation noise so as to reduce an amount of a high frequency noise which is introduced into a vehicle room of the vehicle, wherein the first vibration reducer comprises a front surface of the cowl top panel, a downward bent side of a first reinforcement plate, and a rear surface of the cowl top panel; and
a second vibration reducer to reduce low frequency noise generated from a tire by preventing the cowl top panel and the cowl top upper panel from vibrating, wherein the second vibration reducer comprises a first closed space portion, a second closed space portion, and a third closed space portion, a second reinforcement plate, and a third reinforcement plate.

11. The cowl unit of claim 10, wherein the first closed space portion is formed between the first reinforcement plate and the cowl top panel, wherein a second closed space portion is formed by the cowl top panel, the cowl top upper panel, the second reinforcement plate, and the first reinforcement plate, wherein the cowl top panel comprises the third closed space portion between the third reinforcement plate bonded to a front lower portion of the cowl top panel and a front surface of the cowl top panel.

12. The cowl unit of claim 11,
wherein a first end of the first reinforcement plate is bonded at a first point on the cowl top panel, wherein the cowl top panel is bent downward at the first end of the first reinforcement plate,
wherein a second end of the first reinforcement plate is bonded at a second point on the cowl top panel, and
wherein a first end of the second reinforcement plate is bonded at the first region on the cowl top upper panel,
wherein a second end of the second reinforcement plate is bonded to a third point on the cowl top panel, wherein the third point is between the first point and the second point, wherein the first reinforcement plate bends towards the dash panel in a region comprising the third point.

13. The cowl unit of claim 12, wherein, at the first point, the first end of the first reinforcement plate is bonded to a front inner side of the cowl top panel forming an upper bonding end bent upward at the first end of the first reinforcement plate.

14. The cowl unit of claim 12, wherein, at the second point, the second end of the first reinforcement plate is bonded to a plane of one side of the cowl top panel by forming a lower bonding end horizontally bent at the second end of the first reinforcement plate.

15. The cowl unit of claim 12, wherein the first closed space portion and the second closed space portion are formed while interposing a downward bent region of the first reinforcement plate as a boundary.

16. A cowl unit for a vehicle comprising:
a cowl top panel connected with a dash panel along a vehicle width direction;
a cowl top upper panel bonded in the vehicle width direction along a top end of the cowl top panel, wherein the cowl top upper panel is configured to be assembled to a front glass at a first region;
a first vibration reducer to reduce high frequency noise generated from an engine of the vehicle by blocking a path of an acceleration permeation noise so as to reduce an amount of a high frequency noise which is introduced into a vehicle room of the vehicle, wherein the first vibration reducer comprises a front surface of the cowl top panel, a downward bent side of a first reinforcement plate, and a rear surface of the cowl top panel; and
a second vibration reducer to reduce low frequency noise generated from a tire by preventing the cowl top panel and the cowl top upper panel from vibrating, wherein the second vibration reducer comprises a first closed space portion, a second closed space portion, and a third closed space portion, a second reinforcement plate, and a third reinforcement plate,
wherein a first end of the first reinforcement plate is bonded at a first point on the cowl top panel, wherein the cowl top panel is bent downward at the first end of the first reinforcement plate,
wherein a second end of the first reinforcement plate is bonded at a second point on the cowl top panel, and
wherein a first end of the second reinforcement plate is bonded at the first region on the cowl top upper panel,
wherein a second end of the second reinforcement plate is bonded to a third point on the cowl top panel, wherein the third point is between the first point and the second point, wherein the first reinforcement plate bends towards the dash panel in a region comprising the third point.

17. The cowl unit of claim 16, wherein the first closed space portion is bounded by the first reinforcement plate and the cowl top panel, wherein a second closed space portion is bounded by the cowl top panel, the cowl top upper panel, the second reinforcement plate, and the first reinforcement plate, wherein the third closed space portion is bounded by the third reinforcement plate bonded to a front lower portion of the cowl top panel and a front surface of the cowl top panel.

18. The cowl unit of claim 16, wherein, at the first point, the first end of the first reinforcement plate is bonded to a front inner side of the cowl top panel forming an upper bonding end bent upward at the first end of the first reinforcement plate.

19. The cowl unit of claim 16, wherein, at the second point, the second end of the first reinforcement plate is bonded to a plane of one side of the cowl top panel by forming a lower bonding end horizontally bent at the second end of the first reinforcement plate.

20. The cowl unit of claim 16, wherein the first closed space portion and the second closed space portion are formed while interposing a downward bent region of the first reinforcement plate as a boundary.

\* \* \* \* \*